(12) United States Patent
Sakai et al.

(10) Patent No.: US 6,206,486 B1
(45) Date of Patent: Mar. 27, 2001

(54) BRAKE APPARATUS FOR A VEHICLE

(75) Inventors: Moriharu Sakai; Kaneyoshi Nagatani, both of Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/174,173

(22) Filed: Oct. 16, 1998

(30) Foreign Application Priority Data

Oct. 17, 1997 (JP) .................................................. 9-285673
Aug. 28, 1998 (JP) ................................................ 10-243707

(51) Int. Cl.⁷ ................................................... B60T 8/34
(52) U.S. Cl. ................................... 303/113.5; 303/113.2; 303/115.1
(58) Field of Search ...................... 303/DIG. 10, 116.4, 303/119.3, 11, 901, 113.2, 113.5, 115.1; 137/533.11, 539

(56) References Cited

U.S. PATENT DOCUMENTS

| | | | |
|---|---|---|---|
| 1,700,603 | * | 1/1929 | Vreeland et al. ............... 123/169 PB |
| 2,605,036 | * | 7/1952 | Cozzoli ................................. 222/309 |
| 3,220,351 | * | 11/1965 | Kling ..................................... 417/458 |
| 3,799,132 | * | 3/1974 | MacGuire ......................... 123/119 D |
| 5,496,100 | | 3/1996 | Schmid . |
| 5,505,529 | | 4/1996 | Siegel et al. . |
| 5,538,336 | * | 7/1996 | Reuter et al. ...................... 303/119.2 |
| 5,551,767 | * | 9/1996 | Linkner, Jr. ............................ 303/87 |
| 5,607,208 | * | 3/1997 | Reuter et al. ...................... 303/113.5 |
| 5,722,738 | * | 3/1998 | Beck et al. ......................... 303/116.4 |
| 5,791,747 | * | 8/1998 | Sorensen et al. ................. 303/119.2 |
| 6,070,951 | * | 6/2000 | Nakazawa ......................... 303/113.2 |

FOREIGN PATENT DOCUMENTS

| | | |
|---|---|---|
| 2-204155 | 8/1990 | (JP) . |
| 4-98672 | 8/1992 | (JP) . |
| 8-166073 | 6/1996 | (JP) . |
| 8-318838 | 12/1996 | (JP) . |
| 9-66821 | 3/1997 | (JP) . |

OTHER PUBLICATIONS

WO 94/07067 ; Mar. 31, 1994 (PCT/EP93/02437 filed Sep. 9, 1993) Zutt et al: see abstract.

* cited by examiner

Primary Examiner—Christopher P. Schwartz
(74) Attorney, Agent, or Firm—Pillsbury Winthrop LLP

(57) ABSTRACT

In a brake apparatus provided with an actuator for controlling brake fluid pressure applied to a wheel cylinder, a non-return valve disposed in a conduit connected to a master cylinder so as to allow brake fluid to flow toward the master cylinder. The non-return valve includes a ball serving as a valve body which seats on a valve seat formed between a small diameter portion and a large diameter portion in the conduit. After the ball is installed in the large diameter portion of the conduit, an opening part of the large diameter portion is closed by a lid while limiting a movement range of the ball so that a center of the ball does not reach an axis of a conduit perpendicularly connected to the large diameter portion.

12 Claims, 4 Drawing Sheets

BRAKE APPARATUS FOR A VEHICLE

CROSS REFERENCE TO RELATED APPLICATION

This application is based upon and claims priority from Japanese Patent Applications No. H.9-285673 filed on Oct. 17, 1997, and No. H.10-243707 filed on Aug. 28, 1998, the contents of which are incorporated herein by reference.

BACKGROUND OF THE INVENTION

1. Field of the Invention

The present invention relates to a brake apparatus for a vehicle. In particular, the present invention relates to a brake apparatus for a vehicle provided with an actuator for carrying out antiskid control (ABS actuator).

2. Description of the Related Art

Antiskid control (ABS control) is for adjusting wheel braking force to an optimum value in correspondence to a friction coefficient between a wheel tire and a road surface while preventing the lock of a wheel. In antiskid control, a wheel cylinder pressure (W/C pressure) for causing the wheel braking force is selectively reduced, held, and increased in response to a slip state of the wheel.

An ABS actuator for carrying out ABS control is formed by integrally installing several control valves, several conduits, and an ABS reservoir in a housing. In the housing of the ABS actuator, non-return valves (check valves) for preventing reverse flow of brake fluid are also installed. For example, as described in JP-A-8-166073, a non-return valve is disposed in a conduit between a master cylinder and an ABS reservoir.

When the wheel cylinder pressure is reduced by ABS control, brake fluid is discharged from the wheel cylinder into the ABS reservoir. The brake fluid accumulated in the ABS reservoir is returned toward the master cylinder via a connduit connecting the ABS reservoir to the master cylinder by biasing force of a spring which biases a reservoir piston. However, when the master cylinder generates master cylinder pressure during a normal braking operation, it is necessary to prevent brake fluid from reversely flowing from the master cylinder into the ABS reservoir by the master cylinder pressure. For this purpose, a non-return valve is disposed in the conduit connecting the ABS reservoir to the master cylinder.

In detail, as described in the above-mentioned Patent Publication, the non-return valve is structured by a ball valve, a seat portion as a valve seat for the ball valve, a spring for biasing ball valve toward the seat portion, and a sleeve (plug) for supporting the spring, which are integrally assembled. The non-return valve is press-fit in the conduit to fix the non-return valve in the conduit.

However, because the above-described non-return valve is structured by different kinds of plural parts (ball valve, seat portion, spring and sleeve), and further these parts need to be assembled integrally, a manufacturing cost of the non-return valve is high.

In addition, before brake fluid is poured in a hydraulic path of a brake apparatus, the inside of the hydraulic path is evacuated to promote the pouring of brake fluid. However, in the conventional non-return valve, because the spring biases the ball valve toward the seat portion, a pressure for opening the ball valve is not zero (atmospheric pressure). For this reason, degree of vacuum in the hydraulic path cannot be risen.

SUMMARY OF THE INVENTION

Accordingly, it is an object of the present invention to provide a brake apparatus provided with an actuator having a non-return valve of which a manufacturing cost is low and by which degree of vacuum in a hydraulic path can be risen before brake fluid is poured therein.

In order to achieve the above-described object, in the brake apparatus provided with an actuator for controlling brake fluid pressure applied to a wheel cylinder, a non-return valve disposed in a conduit connected to a master cylinder so as to allow brake fluid to flow toward the master cylinder. The non-return valve includes a ball serving as a valve body which seats on a valve seat formed in said conduit. After the ball is installed in the conduit, an opening part of the conduit is closed by a lid.

The ball is not biased by a spring or the like, and therefore the non-return valve has substantially no valve opening pressure. Thereby, evacuation of air in the conduit can be readily carried out and the degree of vacuum in the conduit can be risen.

Further, the non-return valve can be formed by a ball and a lid which have relatively simple shapes and does not need to be integrally assembled before installed in the conduit, the manufacturing cost thereof can be lowered.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Embodiments of the present invention will now be explained with reference to the drawings.

(First Embodiment)

Figure 1:
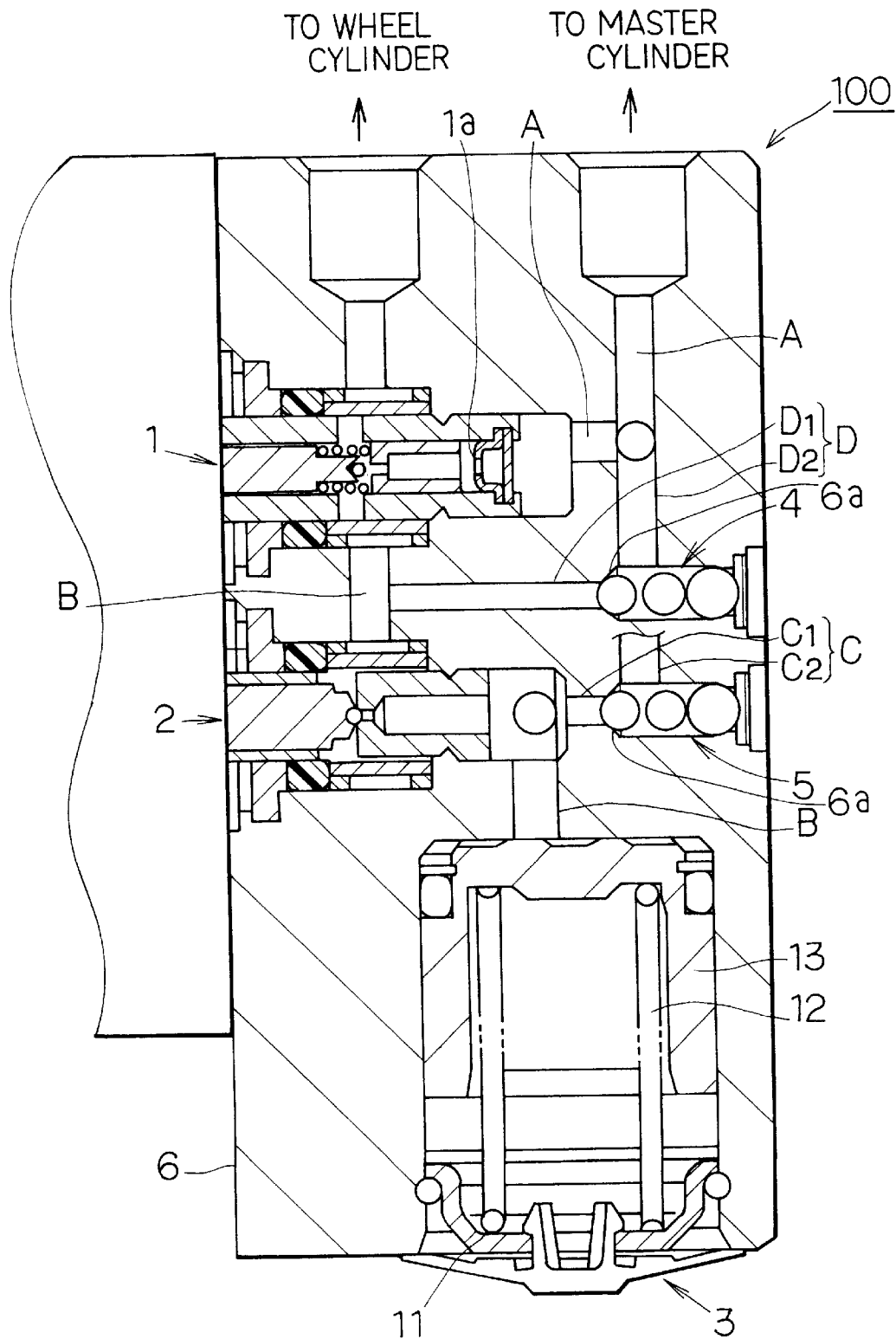
FIG. 1 is a sectional view schematically illustrating a structure of an ABS actuator having non-return valves according to a first embodiment of the present invention.
Figure 2:
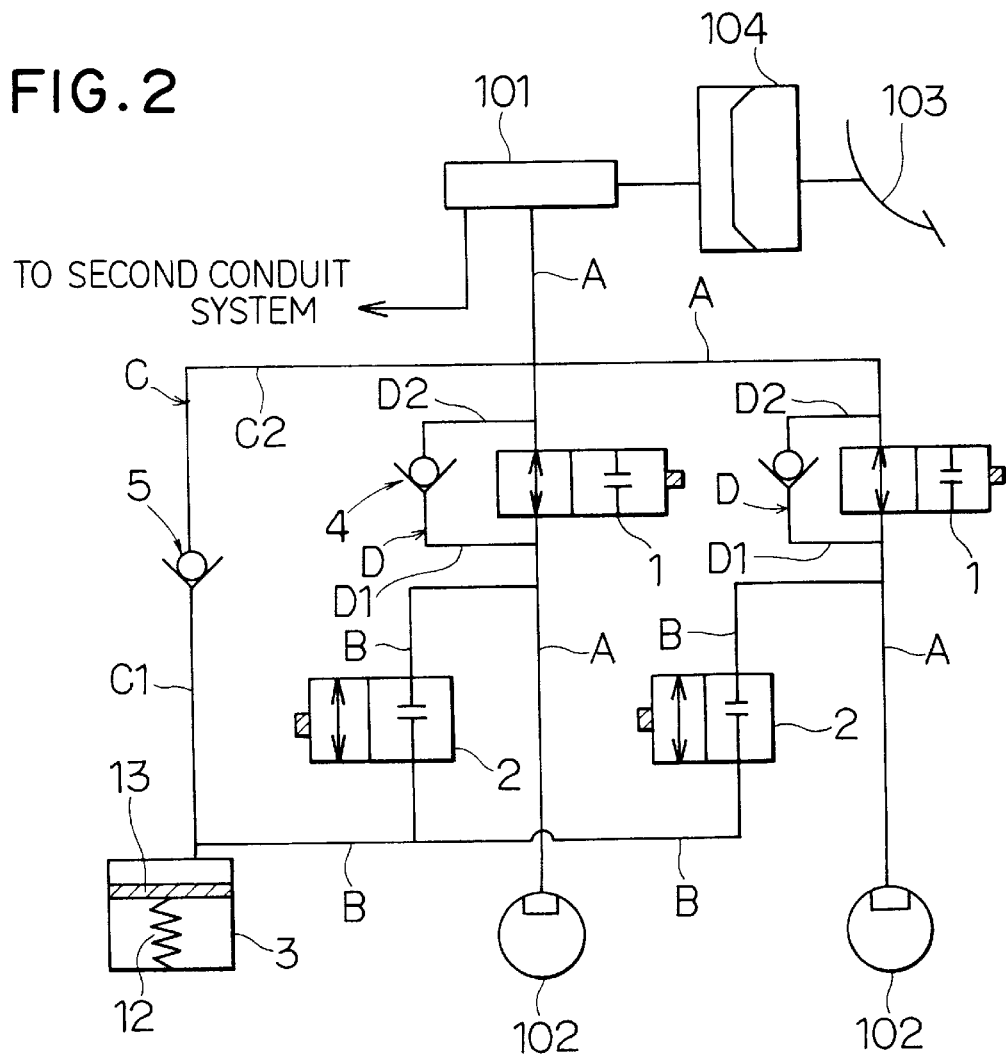
FIG. 2 is a view illustrating a hydraulic circuit structure of a brake apparatus provided with the ABS actuator shown in FIG. 1.

FIG. 1 is a sectional view of an ABS actuator 100, and FIG. 2 is a view of a hydraulic circuit structure of a brake apparatus provide with the ABS actuator 100. The ABS actuator 100 is mounted on a vehicle so that a top and bottom direction in FIG. 1 corresponds to a vertical direction of a vehicle.

As shown in FIG. 2, the ABS actuator 100 is disposed in a conduit connecting a master cylinder 101 and wheel cylinders 102. When a driver depresses a brake pedal 103, depression force is boosted by a booster 104. As a result, the master cylinder 101 generates a master cylinder pressure in correspondence to the boosted depression force. The ABS actuator 100 controls brake fluid pressure applied from the master cylinder 101 to the wheel cylinders 102 to prevent the occurrence of a wheel locking state. Hereinafter, because the structure of the ABS actuator 100 is the same for each of pulral wheel cylinders 102, only the structure of the ABS actuator 100 with respect to one wheel cylinder will be described.

As shown in FIGS. 1 and 2, the ABS actuator is structured by a pressure-increasing control valve 1, a pressure-reducing control valve 2, an ABS reservoir 3 and non-return valves 4, 5, which are contained in a housing 6 made of an aluminum block. In the housing 6, several conduits for allowing the flow of brake fluid are formed. Specifically, a conduit A connects the master cylinder 101 to the wheel cylinder 102. A conduit B connects the conduit A to the ABS reservoir 3. A conduit C is for returning brake fluid in the ABS reservoir 3 toward the master cylinder 101. A conduit D is for swiftly returning brake fluid from the wheel cylinder 102 to the master cylinder 101 when the driver stops the depression of the brake pedal 103.

The pressure-increasing control valve 1 is provided in the conduit A connecting the master cylinder 101 and the wheel cylinder 102 to control the conduit A to a communicating state or a cut-off state. The pressure-increasing control valve 1 is controlled to the communicating state during a normal braking operation other than a period of performing ABS control, whereby brake fluid pressure generated by the master cylinder 101 is transmitted to the wheel cylinder 102 as it is. The pressure-increasing control valve 1 is controlled to the cut-off state when the wheel cylinder pressure is reduced or held by ABS control. At this time, the brake fluid pressure generated by the master cylinder 101 is not transmitted to the wheel cylinder 102.

When the driver stops the depression of the brake pedal 103, brake fluid returns from the wheel cylinder 102 to the master cylinder 101. However, because an orifice 1a is provided in the pressure-increasing control valve 1, the return flow of brake fluid is restricted by the orifice 1a. Therefore, the conduit D is provided to swiftly return brake fluid from the wheel cylinder 102 to the master cylinder 101. In the conduit D, a non-return valve 4 is disposed to prevent brake fluid from flowing from the master cylinder 101 to the wheel cylinder 102 via the conduit D.

The pressure-reducing control valve 2 is provided in the conduit B connecting the conduit A and the ABS reservoir 103 to control the conduit B to a communicating state or a cut-off state. The pressure-reducing control valve 2 is controlled to the communicating state when the wheel cylinder pressure is reduced by ABS control. Thereby, brake fluid in the conduit B including the wheel cylinder 102 escapes into the ABS reservoir 103. Therefore, brake fluid pressure applied to the wheel cylinder 102 is reduced.

The ABS reservoir 3 is provided with a spring 12 and a reservoir piston 13 which is supported by a cover 11. The reservoir piston 13 is biased in an upper direction of the drawing by the spring 12. When the wheel cylinder pressure is reduced, the reservoir piston 13 slides downward in a reservoir chamber due to a pressure of the brake fluid flowing into the ABS reservoir 3. The brake fluid is accumulated in a space formed by the sliding of the reservoir piston 13. After that, when the master cylinder pressure becomes low, the brake fluid in the ABS reservoir 3 returns toward the master cylinder 101 via the conduit C in the housing 6 due to biasing force of the spring 12. Because the conduit C is connected to the master cylinder 101, a non-return valve 5 is provided in the conduit C so that brake fluid does not flow from the master cylinder 101 into the ABS reservoir 3.

Figure 3:
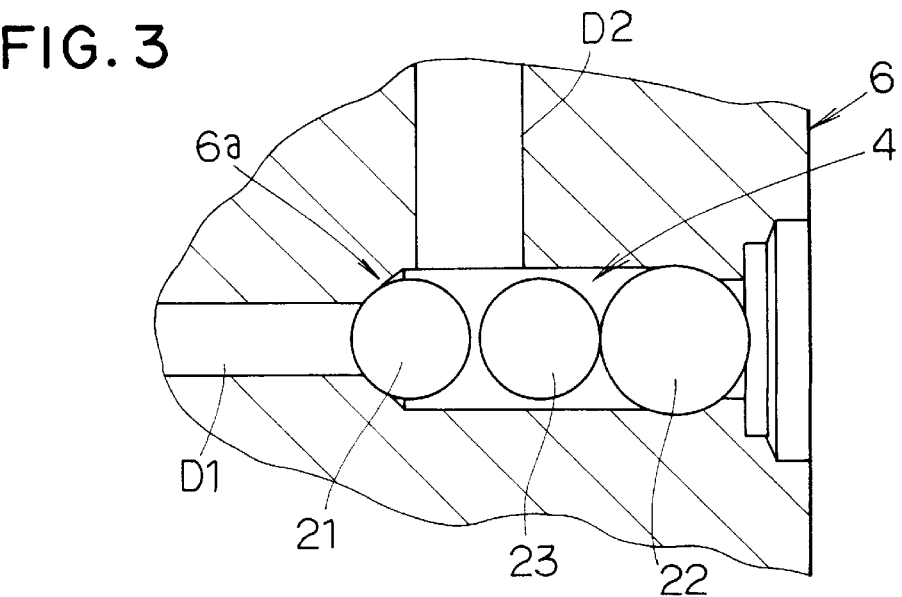
FIG. 3 is a partially enlarged view in the vicinity of the non-return valve 4 shown in FIG. 1.

Next, the structure of the non-return valve 4 will be described by referring to FIG. 3. It is to be noted that the non-return valve 5 has the same structure as that of the non-return valve 4.

The non-return valve 4 is structured by three balls 21–23 and the conduit D. The function of each of the three balls and the conduit D will be described in detail.

The conduit D includes a conduit D1 which is formed by excavating (drilling) a tunnel in the housing 6 from a right-side surface thereof and a conduit D2 which is formed perpendicular to the conduit D1 by drilling. The three balls 21–23 are disposed at a connection between the conduit D1 and the conduit D2. One end of the conduit D1 is connected to the conduit B connected to both the pressure-increasing control valve 1 and the pressure-reducing control valve 2 and the other end thereof is connected to a valve seat 6a for a ball 21 serving as a valve body of the non-return valve 4. One end of the conduit D2 extends from a portion where the ball 21 is installed and the other end thereof is connected to the conduit A leading to the master cylinder 101. In the similar manner, the conduit C includes a conduit C1 formed between the conduit B connected to the ABS reservoir 3 and a ball serving as a valve body of the non-return valve 5 and a conduit C2 formed between the non-return valve 5 and the master cylinder 101.

A diameter of a conduit part in which the three balls 21–23 are installed is made larger than that of the conduit D1(C1). Thereby, the valve seat 6 of a tapered shape is formed between the conduit D1(C1) and the conduit part in which the three balls 21–23 are installed. When the wheel cylinder pressure is higher than the master cylinder pressure, the ball 21 separates from the valve seat 6a, thereby setting the conduit D1 to the communicating state. To contrary, when the wheel cylinder pressure is lower than the master cylinder pressure, the ball 21 is seated on the valve seat 6a, thereby setting the conduit D1 to the cut-off state.

The ball 22 placed on the most right side in the drawing serves as a lid for retaining the ball 21 in the housing 6. Because the conduit D1 is formed by excavating a tunnel from a right-side surface of the housing 6, the right side of the ball 21 is opened to outside. Therefore, it is necessary to dispose the ball 22 serving as the lid on the right side of the ball 21 to close an opening part of the conduit D1.

In detail, the ball 21 having a diameter larger than that of the conduit part in which the ball 21 is installed is press-fit into the conduit part from the opening end thereof. Further, a ball 22 is firmly fixed in the conduit part by crimping a part of the housing 6 using a punch (not shown) at the right-side surface thereof. In this way, because the conduit D1 is closed by a ball 22 having no sharp corner on its surface, burrs are not formed when the ball 22 is press-fit into the conduit D or the part of the housing 6 is crimped. Therefore, it is possible to prevent burrs from contaminating brake fluid flowing through the hydraulic path in the brake apparatus.

The ball 23 placed between the balls 21 and 22 serves as a movement limiting member for limiting the length (range) that the ball 21 can move in a right direction of the drawing (a direction that the ball 21 becomes away from the valve seat 6a). Because a predetermined interval is caused between the balls 21 and 22 owing to the reasons such that a space for crimping the housing 6 to fix the ball 22 thereto is to be ensured, the length in which the ball 21 can move in the right direction becomes long. In such a case, if the center of the ball 21 juts out to a right side of a central axis of the conduit D2, force due to the pressure of brake fluid supplied through the conduit D2 is applied to the ball 21 to move in the right direction. As a result, the ball cannot close the conduit D.

The relationship between the ball 21 and the central axis of the conduit D2 needs to be set so that the ball 21 can close the conduit whenever pressure at the conduit D2 is higher than that at the conduit D1. In the first embodiment, the ball 23 is inserted between the balls 21 and 22. The length that the ball 21 can move in the right direction is limited by the ball 23. As a result, even when the ball 21 moves in the right direction as far as possible, the center of the ball 21 does not jut out to the right side of the central axis of the conduit D2.

The diameter of the ball 21 is set slightly larger than that of the conduit D2 to prevent the ball 21 from entering the conduit D2. Further, it is necessary to prevent the ball 21 from filling up an opening part of the conduit D2. In the first embodiment, because the central axis of the conduit D2 is set between the centers of the balls 21 and 23, i.e., because the centers of the balls 21 and 23 do not coincide with the central axis of the conduit D2, neither the ball 21 nor the ball 23 fills up the conduit D2.

The diameter of the ball 23 is not limited to a specific value as long as it can limit the movement length of the ball 21 without entering the conduit D2. In the first embodiment, the diameter of the ball 23 is made the same as that of the ball 21. Due to this, costs for processing balls 21 and 23 are reduced.

Further, because the non-return valve 4 is mainly formed by three balls 21–23 having simple shapes and these parts do not need to be integrally assembled in advance, the manufacturing cost of the non-return valve 4 can be reduced also in this regard.

Next, the operation of the non-return valve 4 will be described.

When there is no differential pressure between the pressure on the side of the master cylinder 101 and the pressure on the side of the wheel cylinder 102, the ball 21 is in a free state, i.e., can move freely in response to gravitational force acting to the ball 21.

When the pressure on the side of the wheel cylinder 102 is higher than the pressure on the side of the master cylinder 101, the ball 21 separates from the valve seat 6a and makes the conduit D (between the conduits D1 and D2) a communicating state. As a result, brake fluid is swiftly returned from the wheel cylinder 102 to the master cylinder 101 via the conduit D. It is to be noted that, because the orifice 1a is formed in the pressure-increasing control valve 1, the flow of brake fluid flowing through the pressure-increasing control valve 1 is restricted by the orifice 1a. Further, when the pressure on the side of the wheel cylinder 102 is higher than that on the side of the master cylinder 101, the ball 21 moves in the right direction by force based on the differential pressure. However, because the movement of the ball 21 is limited by the ball 23, the ball 21 is retained at a position at which the center of the ball 21 does not reach the central axis of the conduit D2.

When the pressure on the side of the wheel cylinder 102 is lower than that on the side of the master cylinder 101, the ball 21 seats on the valve seat 6a and makes the conduit D a cut-off state. That is, because the ball 21 is retained by the ball 23 at the position at which the center of the ball 21 does not reach the central axis of the conduit D2 even when the ball 21 is moved in the right direction as far as possible, force for moving the ball 21 in a left direction of the drawing is applied thereto by the pressure on the side of the master cylinder 101. In this way, the ball 21 can reliably close the conduit D. As a result, the movement of brake fluid from a master cylinder side to a wheel cylinder side can be carried out only through the pressure-increasing control valve 1.

In a case of the non-return valve 5, the non-return valve 5 is disposed in the conduit C connecting the ABS reservoir 3 to the master cylinder 101. Therefore, the non-return valve 5 can prevent brake fluid from flowing from the master cylinder 101 into the ABS reservoir 3 while allowing the brake fluid accumulated in the ABS reservoir 3 to return to the master cylinder 101.

Because the non-return valves 4, 5 have the above-mentioned structures, the degree of vacuum in the hydraulic path in the ABS actuator 100 can be greatly increased when air in the hydraulic path is evacuated by a vacuum pump or the like. That is, before brake fluid is poured in the hydraulic path, air in the hydraulic path is evacuated by the vacuum pump or the like to establish a vacuum state in the hydraulic path. If the non-return valve 4 is opened when applied with a predetermined differential across it, when a differential pressure across the non-return valve 4 is lower than the predetermined differential pressure, the non-return valve 4 remains closed. At this time, air in the hydraulic path cannot be evacuated sufficiently.

However, in the first embodiment, because a predetermined differential pressure does not need to be applied across the non-return valve 4 to open it, the degree of vacuum in the hydraulic path can be risen. Therefore, the inclusion of air into brake fluid can be prevented.

Further, because valve opening pressures of the non-return valves 4, 5 are substantially zero, it is possible to shorten a working time needed to evacuate the air in the hydraulic path. As a result, an efficiency of the work can be increased.

Next, the operation of the brake apparatus provided with the ABS actuator 100 structured as described above will be described.

In the brake apparatus, the non-return valve 5 is provided in the conduit C connecting the ABS reservoir 3 to the master cylinder 101 and the non-return valve 4 is provided in the conduit D bypassing the pressure-increasing control valve 1. The valve opening pressures of the non-return valves 4, 5 are substantially zero, that is, if the self-weight of the ball 21 is neglected, the valve opening pressures of the non-return valves 4, 5 are equivalent to an atmospheric pressure. A valve body (ball 21) of each of the non-return valves 4, 5 receives pressure generated by the master cylinder 101. When the pressure generated by the master cylinder 101 (the master cylinder pressure) is higher than a pressure in the ABS reservoir 3, the non-return valve 5 is closed by such a differential pressure. In the same way, when the master cylinder pressure is higher than a pressure in the wheel cylinder 102 (wheel cylinder pressure), the non-return valve 4 is closed by such a differential pressure.

The non-return valve 5 opens when the master cylinder pressure is reduced, that is, when the depression of the brake pedal 103 is released. At this time, non-return valve 5 allows brake fluid to flow from the ABS reservoir 3 to the master cylinder 101. Because the valve opening pressure of the non-return valve 5 is substantially zero, the brake fluid accumulated in the ABS reservoir 3 can return to the master cylinder 101 without receiving a flow resistance from the non-return valve 5. Therefore, even when ABS control is started in response to the brake pedal 103 depressed again right after the release of the depression, a sufficient volume for accumulating brake fluid can be ensured in the ABS reservoir 3.

In the same way, the non-return valve 4 also opens when the master cylinder pressure is reduced. At this time, the non-return valve 4 allows brake fluid to flow from the wheel cylinder 102 to the master cylinder 101. In the non-return valve 4 also, because the valve opening pressure is substantially zero, the wheel cylinder pressure can be released without an influence of the flow resistance from the non-return valve 4.

In the conventional brake apparatus, the diameter of the hydraulic path in a pressure-increasing control valve is made smaller by an orifice than that of a brake fluid conduit. Therefore, when brake fluid flows from a wheel cylinder to a master cylinder, the brake fluid receives a large flow resistance from the orifice. As a result, the prompt release of the wheel cylinder pressure is apt to be interrupted. Further, in the conventional brake apparatus, because a ball valve in a non-return valve is biased by a spring, a valve opening pressure is not zero. Thereby, the brake fluid flowing through the non-return valve disposed in parallel to the pressure increasing control valve receives a flow resistance therefrom.

To contrary, because the non-return valve 4 in the first embodiment has substantially no valve opening pressure, the wheel cylinder pressure can be swiftly released therethrough. As a result, it is possible to prevent the brake from continuing to be applied by the brake fluid remaining in the wheel cylinder 102.

(Second Embodiment)

Figure 4:
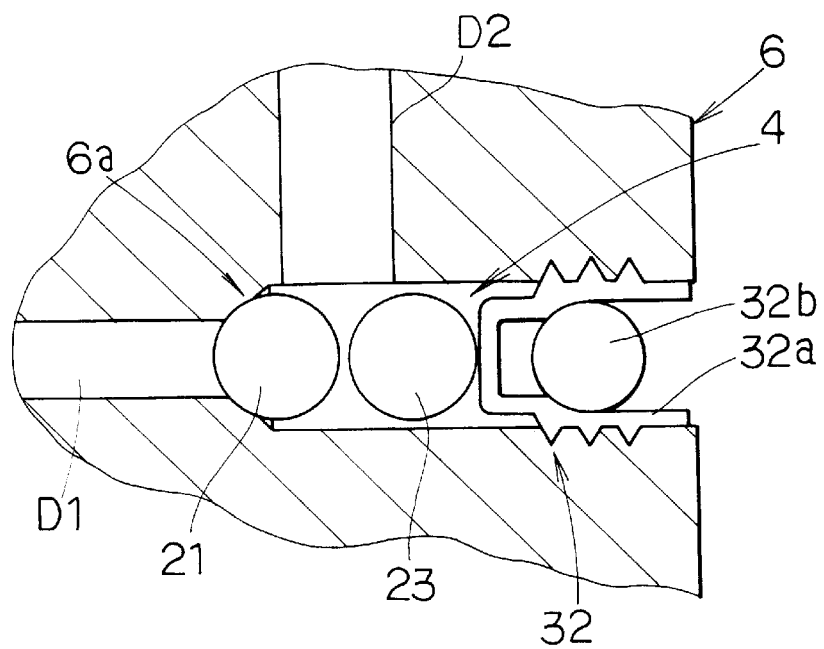
FIG. 4 is a partially enlarged view in the vicinity of a non-return valve according to a second embodiment.

FIG. 4 shows a non-return valve 4 according to a second embodiment. Because an ABS actuator of the second embodiment is structured in the same way as that of the first embodiment, an explanation will be given of the non-return valve 4 which is different from the first embodiment.

As shown in FIG. 4, the non-return valve 4 of the second embodiment uses, as a lid, a lid member 32 in place of the ball 22 in the first embodiment. Because the balls 21, 23 are the same as those in the first embodiment, the explanation therefor is omitted.

The lid member 32 includes a cup member 32a of which a sectional shape is a letter "U", and a ball member 32b which is press-fit inside the cup member 32a. Projections 32c are formed on a cylinderical portion of the cup member 32a so as to extend in a peripheral direction thereof. The diameter of the cup member 32a is made smaller than that of the conduit part into which the balls 21, 23 and the lid member 32 are inserted. However, the diameter of each of the projections 32c is made equal to that of the conduit part.

First, the lid member 32 is inserted into the conduit part from the right side surface of the housing 6. After that, the ball member 32b is press-fit inside the cup member 32a. At this time, the cylindrical portion of the cup member 32a is spread by the ball member 32b. As a result, because the projections 32c cut into an inner wall of the conduit part, the lid member 32 is fixed to the housing 6. In this way, the opening of the conduit D can be closed using the lid member 32 other than the ball 22.

It is to be noted that the lid member 32 may be inserted into the conduit part by pushing the ball member 32b set on an opening portion of the cup member 32a, whereby the both cup member 32a and the ball member 32 are inserted at the same time.

(Third Embodiment)

Figure 5:
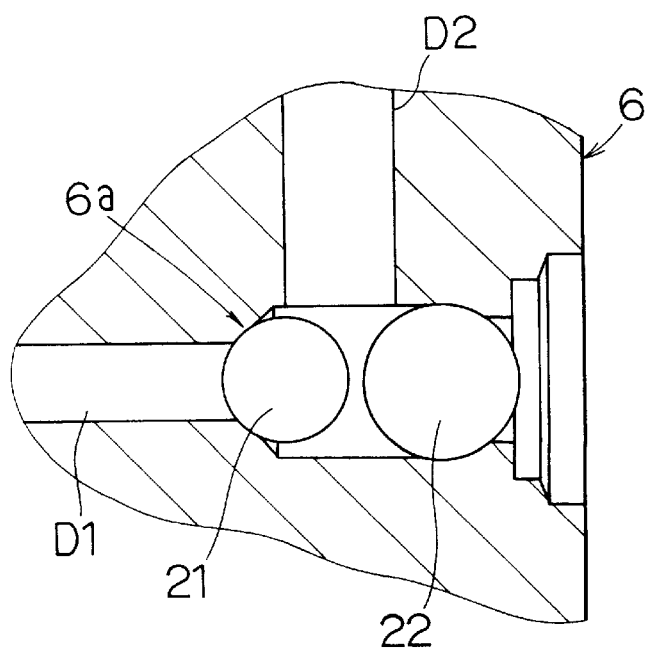
FIG. 5 is a partially enlarged view in the vicinity of a non-return valve according to a third embodiment.

FIG. 5 shows a non-return valve 4 according to a third embodiment. Because an ABS actuator of the third embodiment is structured in the same way as that of the first embodiment, an explanation will be given of the non-return valve 4 which is different from the first embodiment.

As shown in FIG. 5, the non-return valve 4 of the third embodiment dispenses with the ball 23 of the first embodiment. That is, the ball 22 is used not only as a lid for closing the opening of the conduit D but also as a movement limiting member for limiting the movement of the ball 21. It is to be noted that ball 22 is positioned so that a central axis of the conduit D2 is between the centers of the balls 21 and 22, that is, the center of the ball 21 does not reach the central axis of the conduit D2.

As described above, the non-return valve 4 can be structured using only two balls 21, 22. Further, the ball 22 of the third embodiment may be replaced with the lid member 32 of the second embodiment. It is to be noted that the non-return valve 5 is also structured in the same way.

(Fourth Embodiment)

Figure 6:
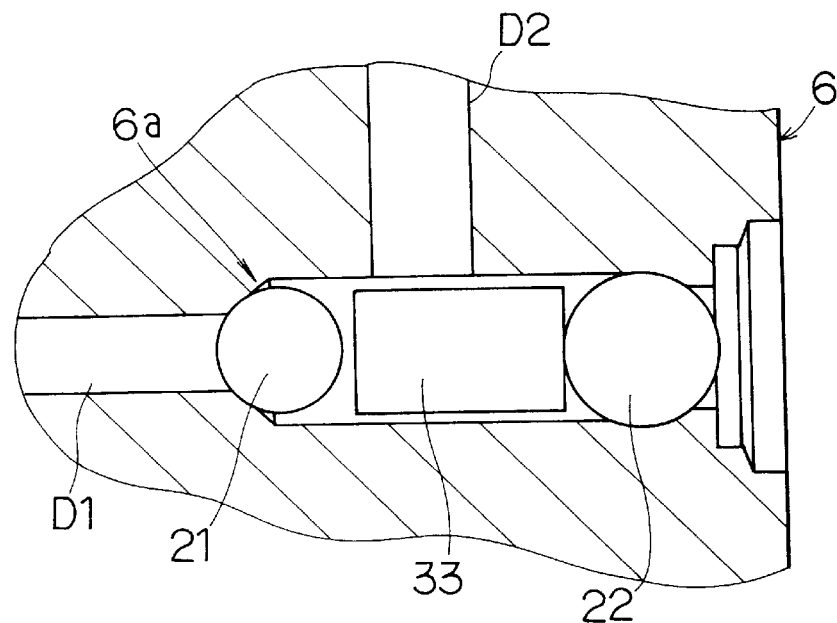
FIG. 6 is a partially enlarged view in the vicinity of a non-return valve according to a fourth embodiment.

In the first embodiment, the non-return valve 4 is structured by three balls 21–23. However, the ball 23 serving as the movement limiting member may be replaced with a member 33 having a shape of a circular cylinder, as shown in FIG. 6. A hollow circular cylinder may be also used as the movement limiting member.

(Fifth Embodiment)

Figure 7:
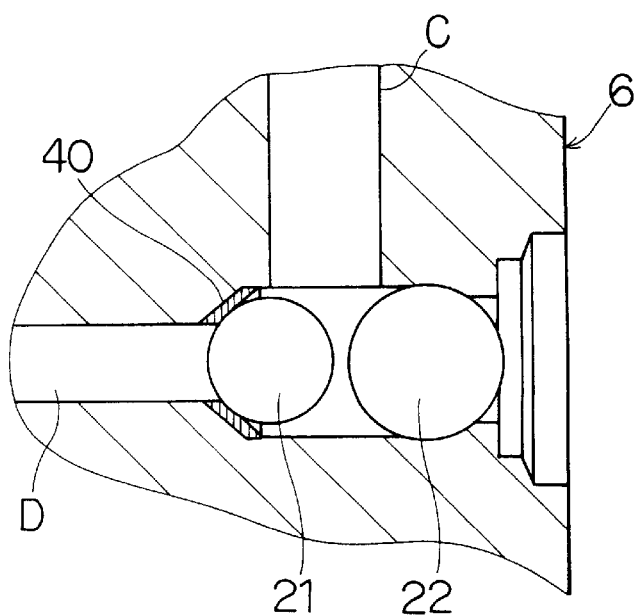
FIG 7. is a partially enlarged view in the vicinity of a non-return valve according to a fifth embodiment.

In the third embodiment, a reinforcement 40 of a tapered shape may be formed on the valve seat 6a to reinforce the valve seat 6a, as shown in FIG. 7. In the same way, the valve seat 6a in the first, second, or fourth embodiment may be reinforced by the reinforcement 40.

(Other embodiments)

In the first embodiment, the diameters of the balls 21 and 23 and the formation position of the conduit D2 are determined so that the central axis of the conduit D2 is between the centers of the balls 21 and 23. However, the central axis of the conduit D2 may be between the centers of the balls 22 and 23. In this case, to prevent the ball 23 from filling up the conduit D2, the ball 22 may limit the movement of the ball 23 so that the center of the ball 23 juts out into the right side of the central axis of the conduit D2. In the same way, the conduit D2 may be formed so that an end thereof is opened between the ball 23 and the lid portion 32 in the second embodiment or between the circular cylinder 33 and the ball 22 in the fourth embodiment.

Further, in the first and second embodiment, although the diameters of the balls 21 and 23 are made equal, these balls can have diameters different from each other. Even in this case, because plural parts having complicated shapes do not need to be used and further these do not need to be integrally assembled, it is possible to achieve the low manufacturing cost of the non-return valve 4.

The brake apparatus may be the one which can carry out brake assisting control, traction control, vehicle motion control, and/or control for enhancing trace performance of a vehicle in addition to ABS control.

In the embodiments described above, the master cylinder 101 is mechanically linked with the brake pedal 103 and generates the master cylinder pressure in response to a depressing operation of the brake pedal 103 by a driver. However, a brake fluid pressure may be generated using a pump or a booster based on an electrical signal corresponding to a braking operation by the driver.

What is claimed is:

1. A brake apparatus comprising:
   a master cylinder which generates a master cylinder pressure;
   a wheel cylinder which produces wheel braking force upon receipt of the master cylinder pressure; and
   an ABS actuator for controlling brake fluid pressure applied to said wheel cylinder, said ABS actuator comprising:
   a reservoir which accumulates brake fluid discharged from said wheel cylinder;
   plural control valves for controlling brake fluid supplied to and discharged from said wheel cylinder;
   a housing for containing said reservoir and said plural control valves, wherein
   a conduit for connecting said reservoir to said master cylinder is formed in said housing, said conduit includes a first conduit and a second conduit, said first conduit has a small diameter portion whose one end is communicated with said reservoir, a large diameter portion formed in the housing and whose one end is opened to one surface of said housing, and a taper shaped valve seat formed so as to bridge another end of the small diameter portion and another end of the large diameter portion, at least the large diameter portion forming a portion of the taper shaped valve seat, and one end of said second conduit is connected to said large diameter portion and an another end of said second conduit is communicated with said master cylinder;

a first ball movably disposed in said large diameter portion, said first ball seating on said valve seat to close said conduit when pressure in said large diameter portion is higher than that in said small diameter portion, and separating from said valve seat to open said conduit when pressure in said large diameter portion is equal to or lower than that in said small diameter portion;

a lid with which fills said one end of said first conduit opened to said one surface of said housing, said lid being fixed to said one end of the first conduit for prohibiting brake fluid communication between the first conduit and the outside of the housing; and a second ball disposed between said first ball and said lid in said large diameter portion, for limiting moving range of said first ball so that a center of said first ball is located on a side of said valve seat rather than an axis of said second conduit.

2. A brake apparatus according to claim 1, wherein said lid is constituted by a third ball which is press-fit into said large diameter portion from said one end of said first conduit, and fixed to said housing by crimping said housing in a vicinity of said one end of said first conduit.

3. A brake apparatus according to claim 1, wherein said lid includes a cup member of which a sectional shape is a letter U, and a ball member which is press-fit inside said cup member, projections are formed on a cylindrical portion of said cup member so as to extend in a peripheral direction thereof, and said cup member and said ball member are fixed to said housing when said cylindrical portion of said cup member is spread by said ball member press-fit into said cup member and said projections cut into an inner wall of said large diameter portion.

4. A brake apparatus comprising:

a master cylinder which generates a master cylinder pressure;

a wheel cylinder which produces wheel braking force upon receipt of the master cylinder pressure; and an ABS actuator for controlling brake fluid pressure applied to said wheel cylinder, said ABS actuator comprising:

a reservoir which accumulates brake fluid discharged from said wheel cylinder;

a pressure increasing valve for controlling brake fluid supplied to said wheel cylinder;

a pressure reducing valve for controlling brake fluid discharged from said wheel cylinder;

a housing for containing said reservoir and said pressure increase and pressure reducing valves, wherein a conduit for connecting said wheel cylinder to said master cylinder while bypassing said pressure increasing valve is formed in said housing, said conduit includes a first conduit and a second conduit, said first conduit has a small diameter portion whose one end is communicated with said reservoir, a large diameter portion formed in the housing and whose one end is opened to one surface of said housing, and a taper shaped valve seat formed so as to bridge another end of the small diameter portion and another end of the large diameter portion, at least the large diameter portion forming a portion of the taper shaped valve seat, and one end of said second conduit is connected to said large diameter portion and an another end of said second conduit is communicated with said master cylinder;

a first ball movably disposed in said large diameter portion, said first ball seating on said valve seat to close said conduit when pressure in said large diameter portion is higher than that in said small diameter portion, and separating from said valve seat to open said conduit when pressure in said large diameter portion is equal to or lower than that in said small diameter portion;

a lid with which fills said one end of said first conduit opened to said one surface of said housings, said lid being fixed to said one end of the first conduit for prohibiting brake fluid communication between the first conduit and the outside of the housing; and a second ball disposed between said first ball and said lid in said large diameter portion, for limiting moving range of said first ball so that a center of said first ball is located on a side of said valve seat rather than an axis of said second conduit.

5. A brake apparatus according to claim 4, wherein said lid is constituted by a third ball which is press-fit into said large diameter portion from said one end of said first conduit, and fixed to said housing by crimping said housing in a vicinity of said one end of said first conduit.

6. A brake apparatus according to claim 4, wherein said lid includes a cup member of which a sectional shape is a letter U, and a ball member which is press-fit inside said cup member, projections are formed on a cylindrical portion of said cup member so as to extend in a peripheral direction thereof, and said cup member and said ball member are fixed to said housing when said cylindrical portion of said cup member is spread by said ball member press-fit into said cup member and said projections cut into an inner wall of said large diameter portion.

7. A brake apparatus comprising:

a master cylinder which generates a master cylinder pressure;

a wheel cylinder which produces wheel braking force upon receipt of the master cylinder pressure;

a reservoir which accumulates brake fluid discharged from said wheel cylinder when a wheel cylinder pressure is reduced;

a main conduit for connecting said master cylinder to said wheel cylinder;

a first conduit for connecting said wheel cylinder to said reservoir;

a second conduit for connecting said reservoir to said master cylinder;

a pressure increasing valve disposed in said main conduit, said pressure increasing valve being in a communicating state when non-energized;

a pressure reducing valve disposed in said first conduit, said pressure reducing valve being in a cut-off state when non-energized;

a first non-return valve connected in parallel to said pressure increasing valve, for allowing brake fluid to flow from said wheel cylinder to said master cylinder when the wheel cylinder pressure is higher than said master cylinder pressure, an valve opening pressure of said first non-return valve being substantially equal to an atmospheric pressure;

a second non-return valve disposed in said second conduit, for allowing brake fluid to flow from said reservoir to said master cylinder when pressure of brake fluid accumulated in said reservoir is higher than said master cylinder pressure, a valve opening pressure of said second non-return valve being substantially equal to an atmospheric pressure; and a housing containing said pressure increasing and pressure reducing valves, said reservoir, said main, first and second conduits and said first and second non-return valves, said first non-return valve comprising:
  a first branch conduit bypassing the main conduit,
  a first non-return valve conduit whose one end is opened to an outside surface of the housing and whose another end is connected with said first branch conduit,
  a first valve seat formed at said another end of the first non-return valve conduit so as to bridge the first non-return valve conduit and the first branch conduit,
  a first lid fixed to said one end of the first non-return valve conduit for prohibiting brake fluid communication between said first branch conduit and said outside of the housing, and
  a first ball disposed in said first non-return valve conduit and to be seated on the valve seat by brake fluid flow from said master cylinder to said wheel cylinder for interrupting the brake fluid flow thereof, and said second non-return valve comprising:
  a second non-return valve conduit whose one end is opened to an outside surface of the housing and whose another end is connected with said second conduit,
  a second valve seat formed at said another end of the second non-return valve conduit so as to bridge the second non-return valve conduit and the second conduit,
  a second lid fixed to said one end of the second non-return valve conduit for prohibiting brake fluid communication between said second conduit and said outside of the housing, and
  a second ball disposed in said second non-return valve conduit and to be seated on the second valve seat by brake fluid flow from said master cylinder to said reservoir for interrupting the brake fluid flow thereof.

8. A brake apparatus according to claim 7, wherein said first and second lids limit movement ranges of said first and second balls, respectively.

9. A brake apparatus according to claim 7, further comprising:

a first movement limiting member disposed between said first ball and said first lid for limiting a movement range of said first ball; and a second movement limiting member disposed between said second ball and said second lid for limiting a movement range of said second ball.

10. A brake apparatus comprising:

a master cylinder which generates a master cylinder pressure;

a wheel cylinder which produces wheel braking force upon receipt of the master cylinder pressure;

a main conduit for connecting said master cylinder to said wheel cylinder;

an actuator disposed in said main conduit for controlling brake fluid pressure applied to said wheel cylinder,
  said actuator comprising:
    an aluminum housing block;
    plural control valves installed in said aluminum housing block for controlling brake fluid supplied to and discharged from said wheel cylinder;
    a reservoir formed by a hole provided in said housing, which accumulates brake fluid discharged from said wheel cylinder;
    conduits formed in said housing by drilling, which interconnect among said master cylinder, said wheel cylinder, said plural solenoid valves, and said reservoir; and
    a non-return valve disposed in said conduits, said non-return valve having substantially no valve opening pressure with respect to brake fluid flowing toward said master cylinder,
  said non-return valve comprising:
    a non-return valve conduit whose one end is opened to an outside surface of the aluminum housing block and whose other end is connected with said conduit,
    a valve seat formed at said other end of the non-return valve conduit so as to bridge the non-return valve conduit and the conduit,
    a lid fixed to said one end of the non-return valve conduit for prohibiting brake fluid communication between said conduit and said outside of the housing, and
    a ball disposed in said non-return valve conduit and to be seated on the valve seat by brake fluid flow from said master cylinder for interrupting the brake fluid flow thereof.

11. A brake apparatus according to claim 10, wherein said lid limits a movement range of said ball.

12. A brake apparatus according to claim 10, further comprising:

a movement limiting member disposed between said ball and said lid for limiting a movement range of said ball.

* * * * *